(12) United States Patent
Dollinger

(10) Patent No.: US 12,118,894 B2
(45) Date of Patent: Oct. 15, 2024

(54) IONIC DISC BONDING MODEL

(71) Applicant: Russell Kenneth Dollinger, Palmdale, CA (US)

(72) Inventor: Russell Kenneth Dollinger, Palmdale, CA (US)

(73) Assignee: Russell K. Dollinger

( * ) Notice: Subject to any disclaimer, the term of this patent is extended or adjusted under 35 U.S.C. 154(b) by 437 days.

(21) Appl. No.: 17/249,988

(22) Filed: Mar. 19, 2021

(65) Prior Publication Data

US 2022/0301456 A1    Sep. 22, 2022

(51) Int. Cl.
   *G09B 23/26*    (2006.01)
   *G09B 1/08*    (2006.01)

(52) U.S. Cl.
   CPC ............... *G09B 23/26* (2013.01); *G09B 1/08* (2013.01)

(58) Field of Classification Search
   CPC .................................. G09B 23/26; G09B 1/08
   See application file for complete search history.

(56) References Cited

U.S. PATENT DOCUMENTS

| | | | | |
|---|---|---|---|---|
| 2,882,617 A | * | 4/1959 | Godfrey | G09B 23/26 63/29.2 |
| 3,183,608 A | * | 5/1965 | Jierree | G09B 23/26 434/281 |
| 4,192,084 A | * | 3/1980 | O'Riordan | G09B 1/08 434/298 |
| 2005/0227213 A1 | * | 10/2005 | Roth | G09B 23/26 434/278 |
| 2014/0370478 A1 | * | 12/2014 | Pfeiffer | G09B 23/26 434/278 |
| 2018/0144660 A1 | * | 5/2018 | Fekl | G09B 23/26 |

FOREIGN PATENT DOCUMENTS

| CN | 209070824 U | 7/2019 |
|---|---|---|
| EP | 2786360 A1 | 10/2014 |
| RU | 2602961 C1 | 8/2015 |

\* cited by examiner

*Primary Examiner* — Jeffrey S Vanderveen

(57) ABSTRACT

The present invention is a magnetic hook-and-loop connecting assembly for an ionic disc bonding model, which allow ionic components with positive or negative charges to be strongly attracted to each other, lock together firmly but softly, and yet still be easily taken apart. The core components of the invention are strong magnets (e.g. neodymium or equivalent) and hook-and-loop (Velcro® or equivalent) connectors, which, generally speaking, are configured as follows: a strong magnet embedded into the disc representing the positive, cationic charge has half of the hook-and-loop system attached to it or attached to an intermediate component adjacent to the magnet. The negative, anionic charge has the strong magnet with opposite orientation to the cationic charge and the other connecting half of the hook-and-loop system attached to the magnet or an intermediate component adjacent to the magnet. The invention can be used to strongly attract the components of the ionic disc bonding model representing anions to the components representing cations, hold them in position firmly, yet allow easy separation.

8 Claims, 5 Drawing Sheets

IONIC DISC BONDING MODEL

CROSS-REFERENCE TO RELATED APPLICATIONS

Provisional application No. 62/992,095 filed on Mar. 19, 2020.

FEDERALLY SPONSORED RESEARCH

Not Applicable

SEQUENCE LISTING OR PROGRAM

Not Applicable

FIELD OF THE INVENTION

The invention relates generally to an ionic disc bonding model.

BACKGROUND

Currently there are a number of solutions on the market for molecular models of compounds that are connected together with covalent bonds where the electrons are shared. There, however, are few that model ionic bonds where electrons are transferred, and the ions are electrostatically attracted to each other. The few attempts at ionic bonding models tend to be rigid models with stick-like connectors that are difficult to put together and harder to take apart. This is particularly true for people that have problems with dexterity. Similarly, people with long fingernails have difficulty manipulating existing models.

Some attempts employed extensions with 3D joints to give some flexibility, but the connectors between atoms or ions hook together very tightly and are thus difficult for some to physically manage. In order to solve the problem of rigid interconnections requiring good physical dexterity, there have been a few attempts to use magnets so the component parts can be attracted to each other. Unfortunately, either the magnets are too weak to be very functional—one has to get them very close together to have an attraction, they snap together quickly, and they tend to fall apart, or so strong that they snap together with great force, often breaking and/or pinching fingers. Getting those strong magnets apart requires strength and great physical dexterity. Thus, the magnetic approach has not been very successful.

SUMMARY

It is desirable to have an ionic disc bonding model which allows students to learn how positive and negative ions are attracted to each other, and that enhances the understanding that when an ionic compound is formed the total charges must add up to zero. For example, iron (III) has a charge of positive three (3); therefore, to form iron (III) chloride with a zero-sum charge, there must be three (3) chloride ions, each with a charge of negative one (1) to balance the positive charge. Furthermore, it is desirable to have a way for the components of the ionic disc bonding model representing the positive and negative charges to be strongly attracted to each other, yet easy to take apart. This is particularly important for students that have poor dexterity due to a physical disability or long fingernails. Still, further, it is desirable to have the magnets in the model components representing the positive and negative charges snap together softly. Strong magnets, such as neodymium, can snap together with such force that they break with sharp edges that can cut a student's hand. Strong magnets can also snap together painfully pinching a student's skin. Separating the extremely tightly held magnets on a screaming child's skin can be very difficult and painful for the student. Still, further, it is desirable to have a way for the components of the ionic disc bonding model representing the positive and negative charges to hold together firmly even while being modified allowing the positive and negative components to snap together softly. The disclosed device advantageously fills these needs and addresses the aforementioned deficiencies by providing an ionic disc bonding model that enables a student to learn that positive and negative ions are attracted to each other, that the total charge of the ionic compound must equal zero, and where the positive and negative components of the ionic disc bonding model can snap together softly and firmly.

Disclosed is an ionic disc bonding model, which is made up of the following components (1) a disc representing the positive ion (cation) with text printed about the ion on the top and bottom of the disc; (2) one or more strong magnet(s) inset or within the top side of the disc thus representing the positive charge(s); (3) a hook or loop side of a hook-and-loop-type connector labeled with a positive charge mark (+) overlying the top of each of the magnets in the positive disc; (4) a disc representing the negative ion (anion) with text printed about the ion on the top and bottom of the disc; (5) one or more flexible extension(s) from the negative disc with a smaller sub-disc at the end of the extension with a strong magnet inset or within the bottom side of the disc thus representing the negative charge; (6) the opposite connector side of the hook-and-loop-type connector in #3, above, labeled with a negative charge mark (−) underneath the bottom of the magnet in the negative sub-disc. These components are related as follows: the negatively charge (−) sub-disc can be attached by a student to one of the spots on the positive (+) ion disc. The connection between the negative ion sub-disc and the positive ion disc can be made by a student. The magnets are oriented in such a way that the negative-ion sub-disc will be attracted to the magnet in the positive ion disc. The attached hook-and-loop connector part connecting the negative-ion sub-disc will soften the connection between the magnets as well as enhancing the connection stability.

The device could also have one or more of the following: (1) the positive ionic disc and negative ionic disc and sub-disc, can be of other shapes, such as a sphere, cube, etc., or a combination of shapes; (2) the ionic discs can be solid with holes to insert the magnets; (3) the ionic discs can be made of two parts—a top and bottom—that are assembled with the magnet locked inside; (4) a locking ring or other locking-type of mechanism can be used to hold the magnets in place; (5) the flexible extension from the negative ionic disc can be extruded from the disc as a single piece, or it could be a separate piece that is attached by some means to the negative ionic disc on one side, and the ionic sub-disc on the other side; (6) the hook-and-loop connectors can be attached directly to the magnet, or to a locking cap immediately adjacent to the magnet; (7) the supplementary, enhancing connection facilitated by the hook-and-loop connectors can be replaced with another connection system, such as suction cups, interlocking microfibers, electrostatic pads, or other temporary connection system that prevents the magnets from touching each other yet allows the component parts to come together firmly and softly.

The disclosed device is unique because it allows the positive and negative components of ions to be strongly attracted to each other, come together softly, hold together firmly, yet be easy to separate from each other. The component design allows students to quickly and repeatedly combine, separate, and recombine different ions easily, and successfully learn the formulas of many different ionic compounds. Further, the ease with which the ionic bond model components can be put together and taken apart allows students with physical barriers to functionally have better finger mobility and control to easily use the ionic bond model.

The disclosed device is superior to other known ionic bond models because instead of using a single connecting system of only one type, such as a stick-to-hole or a magnet-to-magnet connection, it uses a dual connection system thus allowing strong attraction between the ionic bond model components, which can come together softly, hold firmly, and remain easy to separate from each other quickly with little force.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Ionic disc bonding model may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION OF THE PREFERRED EMBODIMENTS

The present invention is directed to ionic disc bonding model

In its most complete version, the device is made up of the following components: (1) a positive ionic disc composed of a top and bottom made of a type of plastic, non-magnetic metal, or other material, each with printed material about the ion, that snap together with a cavity on the bottom part to insert a magnet, and with top part constructed such that there is a cap sitting on top of the magnet locking it into position and an indentation on the top of the cap; (2) a magnet locked into the cavity described, above; (3) a hook-and-loop connector is placed into the indentation with the connecting part facing upward; (4) a negative ionic disc type made from a type of plastic, non-magnetic metal, or other material, with printed material about the ion, and with one or more flexible extensions coming from the negative ionic disc and extending to the negative ionic sub-disc that is composed of a top with cavity for a magnet; (5) a magnet to fit into the cavity of the top part of the negative ionic sub-disc and oriented oppositely to that of the magnet in #2, above; (6) a bottom of the ionic sub-disc made from a type of plastic, non-magnetic metal, or other material that snaps together with the top of the sub-ionic disc and locks the magnet in place; (7) the corresponding hook-and-loop component to that of the positive hook-and-loop connector is attached to the bottom of the ionic sub-disc bottom component.

Figure 1:
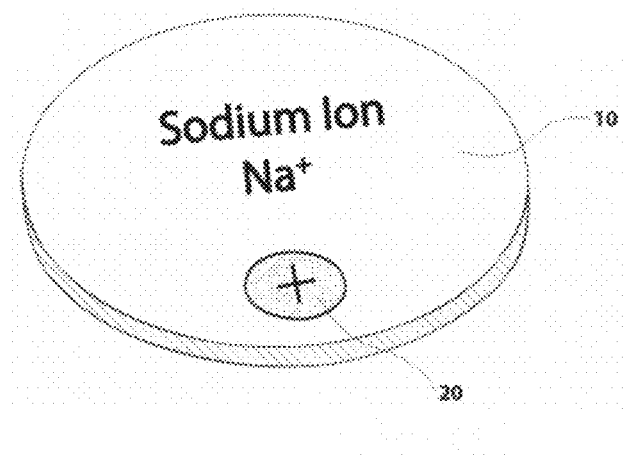
FIG. 1 is a diagram representing a top, perspective view of a cationic disc with one positive charge, which is one part of an exemplary embodiment of the ionic disc bonding model.

Referring now to FIG. 1, a diagram is shown illustrating a top view of a labeled positive cationic disc 10 with a single positive charge in accordance with an exemplary embodiment of the invention. As shown, the positive cationic disc 10 includes an overlying hook-and-loop type of connector 20 with a label indicating the positive nature of the connector and underlying magnet (shown as element 80 in FIG. 3). Of course, a circular, disc shape and hook-and-loop positioning and shape is merely illustrative, and the cationic component of the ionic disc model can be of any width and any length that include the features described herein and are intended to be within this disclosure and make up the overall invention, which has many different embodiments.

Figure 2:
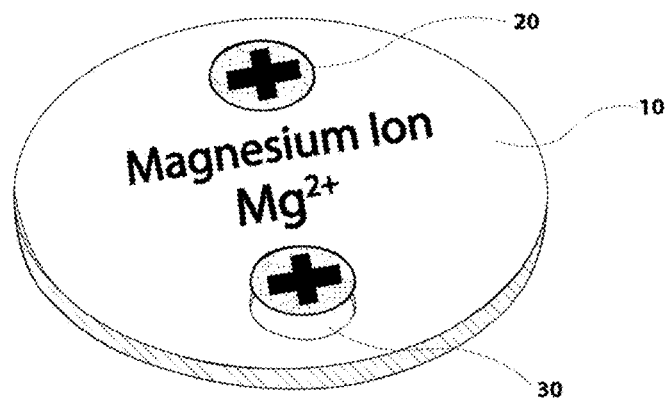
FIG. 2 is a diagram representing a top, perspective view of a cationic disc with two positive charges, which is one part of an exemplary embodiment of the ionic disc bonding model.

Referring now to FIG. 2, a diagram is shown illustrating a top view of a labeled positive cationic ionic disc 10 with two positive charges in accordance with an exemplary embodiment of the invention. As shown, the positive cationic disc 10 includes an overlying hook-and-loop type of connector 20 with a label indicating the positive nature of the connector and each with an underlying magnet (shown as element 70 in FIG. 3). Of notice in this figure is a depression 30 in the cationic disc 10, which allows the correct positioning of the hook-and-loop type connector 20 as well as allowing the connector 20 to sit flush with the surface of the cationic disc 10. Of course, a circular, disc shape and hook-and-loop positioning and shape is merely illustrative, and the cationic component of the ionic disc model can be of any width and any length that include the features described herein and are intended to be within this disclosure and make up the overall invention, which has many different embodiments.

Figure 3:
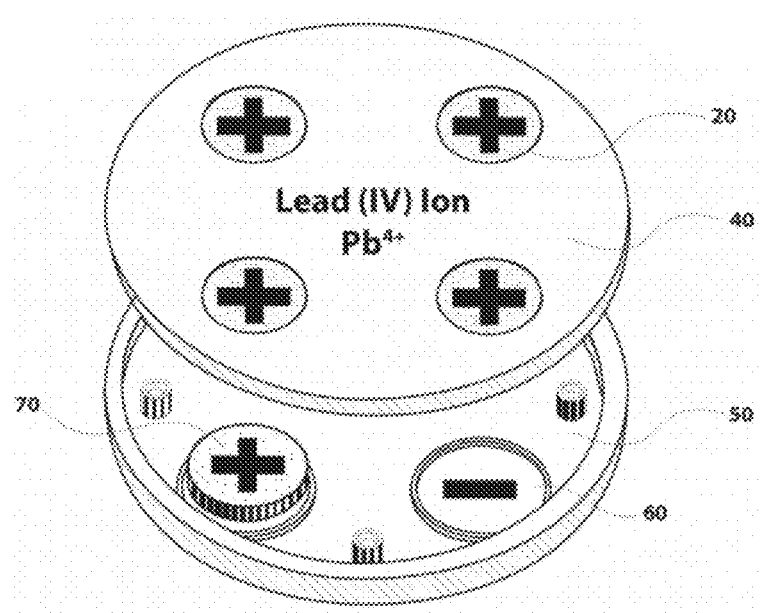
FIG. 3 is a diagram representing a top, perspective view of a cationic disc separated into pieces showing a possible placement and arrangement of strong embedded magnets, which is one part of an exemplary embodiment of the ionic disc bonding model.

Referring now to FIG. 3, a diagram is shown illustrating a top view of a labeled positive cationic disc 10 with four positive charges in accordance with an exemplary embodiment of the invention. As shown, the positive cationic disc 10 includes four (4) overlying hook-and-loop type connectors 20, each with a label indicating the positive nature of the connector and each with an underlying magnet 70. Of notice in this figure is one possible embodiment for how the disc is composed of a top half 40 and a bottom half 60. Note that there are labeled depressions 60 in the bottom half 50 indicating the correct orientation of an embedded magnet 70. The magnet 70 is oriented with the positive (+) side upward as indicated by the overlying hook-and-loop type connector 20. The minus (−) label in the depression 60 in the bottom half 50 indicates how the magnet 70 must be oriented during assembly. Of course, a circular, disc shape and hook-and-loop positioning and shape as well as the possible placement of the magnet 70 is merely illustrative and the cationic component of the ionic disc model can be of any width and any length that include the features described herein and are intended to be within this disclosure and make up the overall invention, which has many possible different embodiments.

Figure 4:
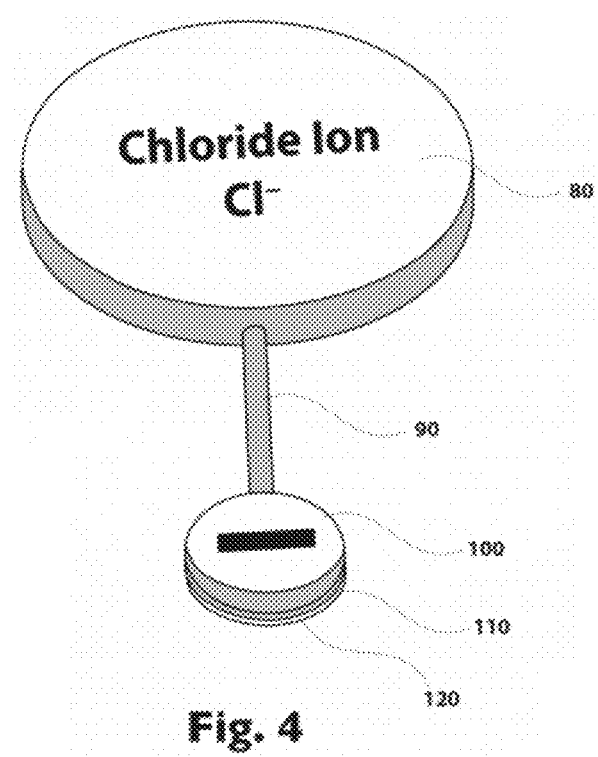
FIG. 4 is a diagram representing a top, perspective view of an anionic disc with an extended sub-disc with one negative charge, which is one part of an exemplary embodiment of the ionic disc bonding model.

Referring now to FIG. 4, a diagram is shown illustrating a top view of a labeled negative anionic disc 80 with an extension 90 and an attached labeled, negative sub-disc 100 at the end of the extension 90. Attached to the bottom of the sub-disc 100 is a cap 110 to secure a strong magnet 130 (shown in FIG. 5) within the negative sub-disc 100. Attached to the bottom of the cap 110 is the corresponding side 120 of a hook-and-loop type of connector 20 as seen in FIGS. 1-3. As such the two parts of the hook-and-loop type connector, 20 from FIGS. 1-3 and 120 from this figure are oriented to connect together thus temporarily holding the positive ionic disc 10 together with the negative ionic sub-disc 100. Of course, a circular, disc shape and hook-and-loop positioning and shape is merely illustrative, and the cationic component of the ionic disc model can be of any width and any length that include the features described herein and are intended to be within this disclosure and make up the overall invention, which has many different embodiments.

Figure 5:
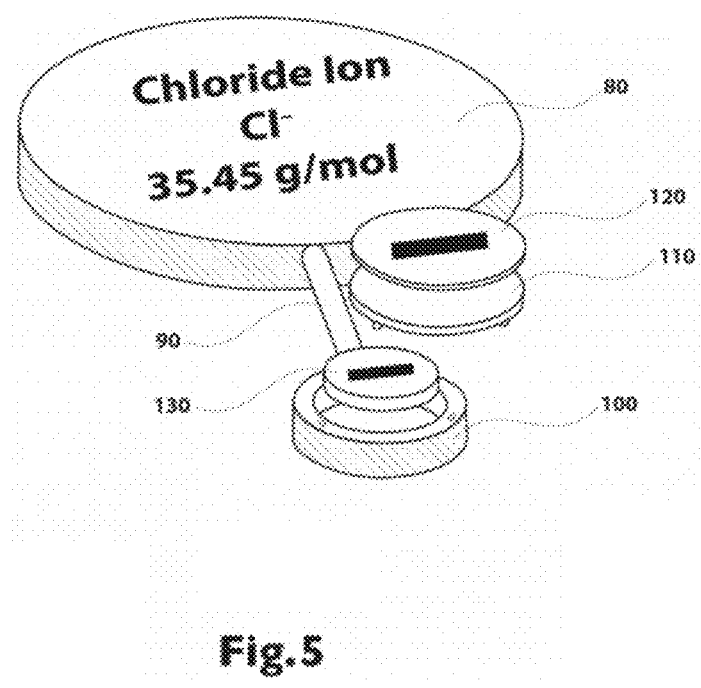
FIG. 5 is a diagram representing a bottom, perspective view of an anionic disc with an extended sub-disc with one negative charge separated showing a possible placement of an embedded magnet, which is one part of an exemplary embodiment of the ionic disc bonding model.

Referring now to FIG. 5, a diagram is shown illustrating a bottom view of a labeled negative anionic disc 80 with an extension 90 and an attached labeled, negative sub-disc 100 at the end of the extension 90. Attached to the top of the sub-disc 100 is a cap 110 to secure a strong magnet 130 in a cavity within the negative sub-disc 100. Attached to the top of the cap 110 is the corresponding negatively labeled side 120 of a hook-and-loop type of connector 20 as seen in FIGS. 1-3. As such the two parts of the hook-and-loop type connector, 20 from FIGS. 1-3 and 120 from this figure are oriented to connect together thus temporarily holding the positive ionic disc 10 together with the negative ionic sub-disc 100. Of course, a circular, disc shape and hook-and-loop positioning and shape is merely illustrative, and the cationic component of the ionic disc model can be of any width and any length that include the features described herein and are intended to be within this disclosure and make up the overall invention, which has many different embodiments.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

I claim:

1. An ionic bond modeling system comprising:
   (a) a positive ion (cation), from a plurality of possible cations further comprising:
   (1) a three-dimensional disc-shaped structure with at least one indica showing the type of ion represented by that model;
   (2) at least one indica with information about that ion such as molar mass, ionization energy, and a plurality of other possible information as is known by those skilled in the art;
   (3) one or more strong magnet(s) inset or within the top side of the disc thus representing the positive charge(s);
   (4) a hook or loop side of a connector, wherein the connector is a hook-and-loop connector, labeled with a positive charge mark (+) overlying the top of each of the magnets in the positive, three-dimensional disc-shaped structure;
   (b) a negative ion (anion), from a plurality of possible anions further comprising:
   (1) a three-dimensional disc-shaped structure with at least one indica showing the type of ion represented by that model;
   (2) at least one indica with information about that ion such as molar mass, ionization energy, and a plurality of other possible information as is known by those skilled in the art;
   (3) one or more flexible extension(s) from the negative three-dimensional disc-shaped structure with a smaller sub-disc-shaped structure at the end of the extension with a strong magnet inset or within the bottom side of the disc thus representing the negative charge;
   (4) the opposite connector side of the hook-and-loop-type connector in (a)(4), above, labeled with a negative charge mark (−) underneath the bottom of the magnet in the negatively charged sub-disc-shaped structure.

2. The ionic bond modeling system as in claim 1, wherein the connector consists of a hook-and-loop connector, suction cups, interlocking microfibers, opposing rubber pads, electrostatic pads, or a Van der Waals connector that prevents the magnets from touching each other yet allows the component parts to come together softly and firmly.

3. The ionic bond modeling system as in claim 1, wherein the three-dimensional disc-shaped structure can be of other shapes, such as a sphere, cube, etc., or a combination of shapes.

4. The ionic bond modeling system as in claim 1, wherein the ionic discs can be solid with holes or slots to insert the magnets.

5. The ionic bond modeling system as in claim 1, wherein the three-dimensional disc-shaped structure can be made of two parts—a top and bottom—that are assembled with the magnet locked inside.

6. The ionic bond modeling system as in claim 1, wherein a locking ring or other locking-type of mechanism can be used to hold the magnets in place.

7. The ionic bond modeling system as in claim 1, wherein the flexible extension from the negative three-dimensional disc-shaped structure can be extruded from the disc as a single piece, or it could be a separate piece that is attached by some means to the negative ionic three-dimensional disc-shaped structure on one side, and the ionic sub-disc-shaped structure disc on the other side.

8. The ionic bond modeling system as in claim 1, wherein the hook-and-loop connectors can be attached directly to the magnet, or to a locking cap immediately adjacent to the magnet.

* * * * *